United States Patent
Epperson

(10) Patent No.: US 6,930,633 B1
(45) Date of Patent: Aug. 16, 2005

(54) ADAPTIVE GLINT REDUCTION METHOD AND SYSTEM

(75) Inventor: Edwin H. Epperson, Claremont, CA (US)

(73) Assignee: Raytheon Company, Waltham, MA (US)

( * ) Notice: Subject to any disclaimer, the term of this patent is extended or adjusted under 35 U.S.C. 154(b) by 1826 days.

(21) Appl. No.: 07/172,058

(22) Filed: Mar. 22, 1988

(51) Int. Cl.$^7$ .................. G01S 13/534; G01S 13/00
(52) U.S. Cl. .................. 342/159; 342/89; 342/195; 342/161
(58) Field of Search .................. 318/636; 356/152, 356/153; 364/164, 165, 178, 179, 184, 574, 575, 456, 457; 342/62, 25, 172, 89, 149, 159, 162, 195, 161

(56) References Cited

U.S. PATENT DOCUMENTS

| | | | |
|---|---|---|---|
| 3,265,870 A | | 8/1966 | Bose |
| 3,446,949 A | | 5/1969 | Trimble ............... 235/152 |
| 3,523,659 A | | 8/1970 | Epperson, Jr. ........ 244/3.17 |
| 3,527,429 A | | 9/1970 | Hawes ............... 244/3.14 |
| 3,557,354 A | | 1/1971 | Trimble ............... 235/152 |
| 3,758,757 A | | 9/1973 | Buhler et al. ........ 235/150.1 |
| 3,805,032 A | | 4/1974 | Ross ............... 235/150.1 |
| 3,897,918 A | | 8/1975 | Gulick, Jr. et al. ...... 244/3.19 |
| 3,938,145 A | * | 2/1976 | Brook et al. .......... 342/26 |
| 3,954,340 A | * | 5/1976 | Blomqvist ............ 356/152 |
| 4,071,744 A | | 1/1978 | Pollock .............. 365/105 |
| 4,129,775 A | * | 12/1978 | O'Meara ............. 356/152 |
| 4,148,029 A | | 4/1979 | Quesinberry .......... 343/9 |
| 4,193,118 A | | 3/1980 | Nash et al. .......... 364/734 |
| 4,200,871 A | * | 4/1980 | Roeder .............. 342/78 |
| 4,220,953 A | * | 9/1980 | Carre ............... 342/149 |
| 4,486,756 A | * | 12/1984 | Peregrim et al. ....... 342/149 |
| 4,494,184 A | | 1/1985 | Crevel .............. 364/178 |
| 4,513,385 A | | 4/1985 | Muri ............... 364/572 |
| 4,524,359 A | * | 6/1985 | Chamagne ........... 342/89 |
| 4,546,355 A | * | 10/1985 | Boles .............. 342/25 |
| 4,587,620 A | | 5/1986 | Niimi et al. ......... 364/574 |
| 4,589,610 A | * | 5/1986 | Schmidt ............ 342/25 |
| 4,613,863 A | * | 9/1986 | Mitchell ............ 342/172 |

FOREIGN PATENT DOCUMENTS

JP          5575304          6/1980

* cited by examiner

*Primary Examiner*—Ian J. Lobo
(74) *Attorney, Agent, or Firm*—Thomas J. Finn; Leonard A. Alkov; Karl A. Vick

(57) ABSTRACT

A method and system for adaptively reducing, in a displacement signal having a value indicative of a measured angular displacement between an antenna boresight and an apparent line of sight to a target, a noise signal having a value indicative of an angular error induced by a shift in the target radar centroid so as to provide an output signal having a value indicative of an estimate of a true angular displacement signal between the antenna boresight and a true line of sight to the target.

14 Claims, 6 Drawing Sheets

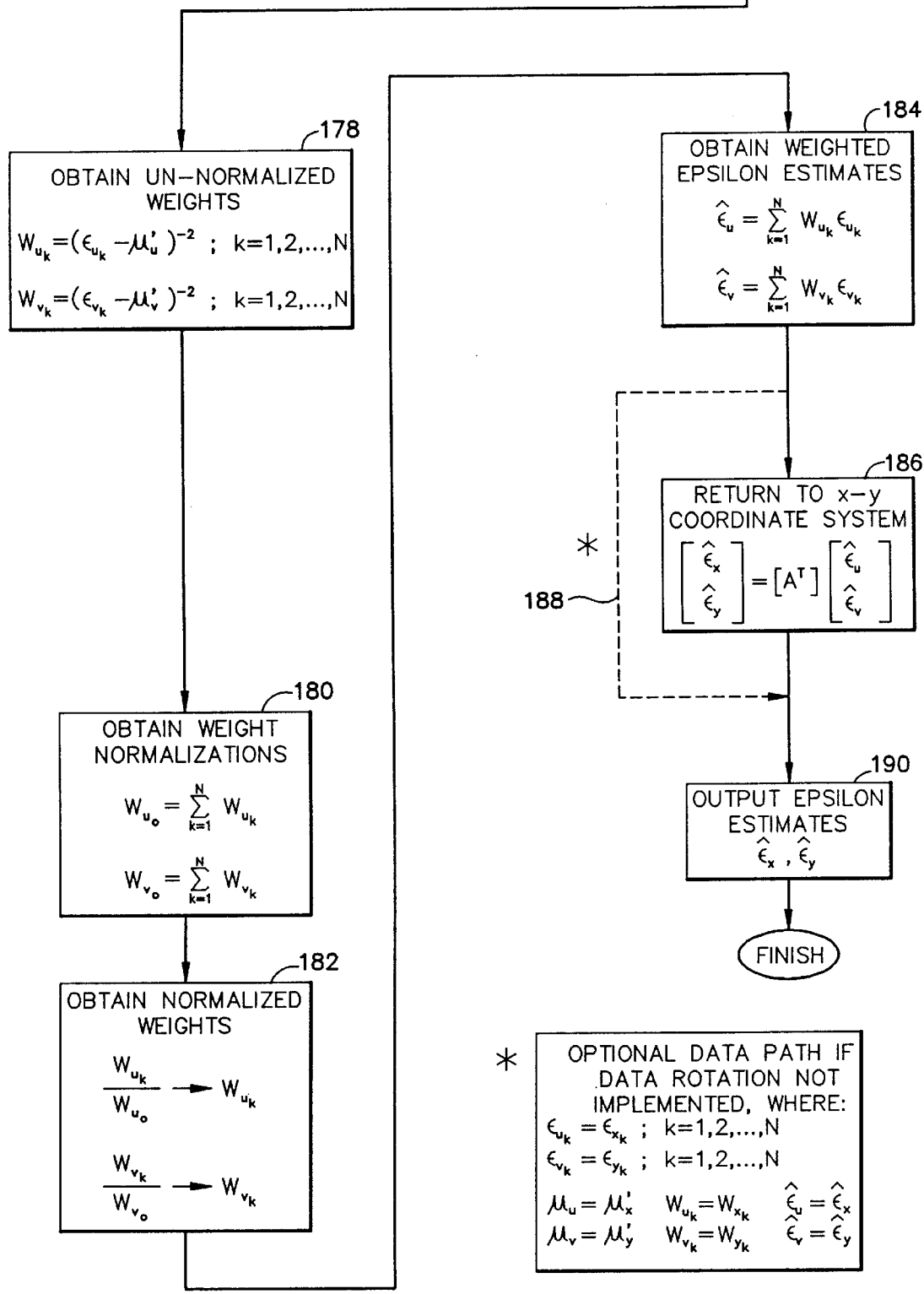

ADAPTIVE GLINT REDUCTION METHOD AND SYSTEM

BACKGROUND OF THE INVENTION

I. Field of the Invention

The present invention relates to a method and system for reducing angular noise in the processing of radar signals. More specifically, the present invention relates to a novel and improved method and system for estimating target angle information by adaptively reducing target induced glint in radar signals reflected from the target, especially in radar systems employed in line of sight (LOS) rate tracking loop applications.

II. Background Art

In conventional radar tracking systems, a target is generally tracked by virtue of the entire target radar return signal. Furthermore, radar tracking systems are generally employed to track targets such as aircraft or missiles, which are generally complex in shape. It is well known that the total radar return signal reflected by a target is composed of the vector sum of superimposed return signals from the individual parts of the target.

Movement of the target and its integrated parts with respect to the tracking radar system may cause the total return signal to change with time. These changes in the total return signal are exhibited as perturbations or target noise in the measured parameters of the target. One type of target noise is referred to as angle noise and is discussed in further deail in *Radar Handbook*, 1970, McGraw-Hill, Inc., Chapter 28 at Pages 28-1 through 28-15.

The measured angular position of an apparent source of the return signal reflected from a target is dependent upon the relative phase and amplitude of the component return signals and their relative angular positions. Target movement can cause the apparent source of the total return signal to move about a reference point on the target. Angle noise due to target movement, also known as glint, results in a change with time of the apparent location of the target with respect to the target reference point, typically the target centroid, i.e., the "center of gravity" of the distribution of the target reflecting areas. It should be noted that the target centroid is typically the long-time-averaged tracking point on the target.

Angular noise, in certain cases, may result in the measured or apparent angular position of the target to fall outside the actual physical boundaries of the target. In applications where precise measurement of the target is required, angular noise may adversely affect the measurement of the target location. For example, where the radar tracking system is located on a tactical missile and integrated into a LOS rate tracking loop, error caused by angular noise may result in a missile failing to intercept the tracked target.

It is, therefore, an object of the present invention to provide a new and improved method and system for adaptively reducing the affect of angular noise in a target radar return signal.

It is yet another object of the invention to provide a method and system for adaptively reducing, in a displacement signal having a value indicative of a measured angular displacement between an antenna electrical boresight and an apparent line of sight to a target, a noise signal having a value indicative of an angular error induced by a shift in the target radar centroid so as to provide a signal having a value indicative of an estimate of a true angular displacement between the antenna boresight and a true line of sight to the target.

SUMMARY OF THE INVENTION

The present invention is a method and system for adaptively reducing, in a displacement signal having a value indicative of a measured angular displacement $\epsilon$ between an antenna boresight and an apparent line of sight to target, a noise signal having a value indicative of an angular error induced by a shift in the target radar centroid so as to provide an output signal having a value indicative of an estimate $\hat{\epsilon}$ of a true angular displacement between the antenna boresight and a true line of sight to the target. The method comprises the steps of providing a series of sequential samples of the displacement signal each having a respective sample value $\epsilon_k$. For each sample value $\epsilon_k$, a corresponding value $\mu_k$ indicative of a long-term estimate of the measured angular displacement $\epsilon$ is generated. A corresponding weighting factor $W_k$ is generated for each sample value $\epsilon_k$. Each sample value $\epsilon_k$ is multiplied by a corresponding weighting factor $W_k$ to provide a corresponding weighted sample value $\epsilon_k$. The last N weighted sample values $\epsilon_k$ are summed and provided as the output signal. When the next sample value $\epsilon_k$ is obtained, the weighting factors $W_k$ are generated anew for each of the last N sample values $\epsilon_k$.

The system comprises a memory means for receiving a series of sequential samples $\epsilon_k$ of the displacement signal and storing a set of N sequential samples $\epsilon_k$ of the displacement signal with a first sample, i.e. the oldest sample, and a last sample, i.e. the current sample, in the set of samples respectively being samples $\epsilon_I$ and $\epsilon_N$. A filter means receives each sample of the series of sequential samples $\epsilon_k$ and generates for the current set of samples $\epsilon_I$, thru $\epsilon_N$ a signal $\mu_k$ corresponding to a current long-term estimate of the measured angular displacement. Weighting means receives the current set of N $\epsilon_k$ samples and a corresponding $\mu_k$ signal and generates a weighting factor $W_k$ corresponding to each $\epsilon_k$ sample. The system further includes estimator means for receiving the set of N $\epsilon_k$ samples and a set of corresponding weighting factors $W_k$ for multiplying each $\epsilon_k$ sample by a corresponding weighting factor $W_k$ so as to provide a corresponding weighted sample $\epsilon_k$. The estimator means further sums the set of N weighted samples $\epsilon_k$ and provides an output signal as the sum of the set of N $\epsilon_k$ weighted samples.

The method and system of the present invention may be employed using multiple reference axes, such as azimuth and elevation, for improved tracking of a target. In multiple axes methods and systems, rotation of track error data may be implemented to reduce correlation errors between angle track error data obtained with respect to each different reference axis.

BRIEF DESCRIPTION OF THE DRAWINGS

These and other features, objects, and advantages of the present invention will be more fully apparent from the detailed description set forth below, taken in conjunction with the drawings in which like reference characters identify correspondingly throughout and wherein.

DETAILED DESCRIPTION OF THE PREFERRED EMBODIMENTS

Figure 1:
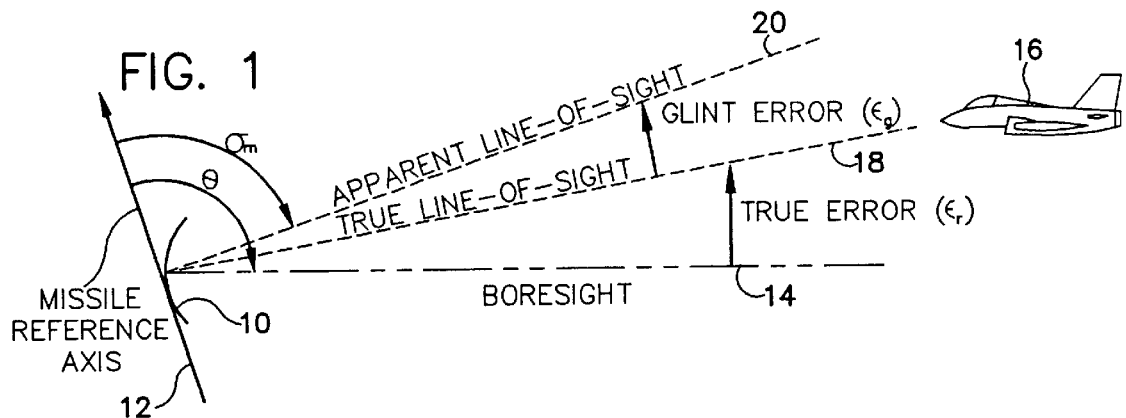
FIG. 1 is a diagram illustrating the relationship between a missile reference axis, the missile antenna boresight and target lines of sight.

FIG. 1 is a diagramatic illustration of the relationship between a missile reference axis, the missile radar system antenna boresight and the apparent and true lines of sight to a target. In FIG. 1 a missile radar antenna 10 is typically gimble mounted upon a missile (not shown) having a reference axis 12. Antenna 10 has an electrical boresight axis which is illustrated in FIG. 1 by the broken line identified by reference numeral 14. A true line of sight from antenna 10 to target 16 is indicated by the dashed lines identified by reference numeral 18. The angular displacement between antenna boresight 14 and the true line of sight 18 is generally defined as the true angular error $\epsilon_r$.

In an ideal radar system, the radar signals reflected from target 16 would result in the measurement of only the true angular error $\epsilon_r$ between the antenna boresight 14 and the true line of sight 18 to target 16. In actuality, angular noise or glint is developed in the radar beam when reflected from different surfaces of the moving target which causes an additional angular error $\epsilon_g$ to be measured by the radar system. This noise generated angular error or glint error $\epsilon_g$ in the measured angular displacement results in an apparent line of sight being generated by the radar system. This apparent line of sight to the target may or may not fall within the actual physical boundaries of the target. For example, as illustrated in FIG. 1, noise in the measured radar return signal results in the apparent line of sight, indicated by the dashed lines identified by reference numeral 20, which is angularly displaced from true line of sight 18.

Apparent line of sight 20 is the line of sight to target 16 that is generated by the radar system. However, usage of apparent line of sight 20 to target 16 does not enable accurate missile guidance commands to be generated within the missile. Without accurate guidance commands being generated, the probability of the missile failing to intercept the target increases.

Figure 2:
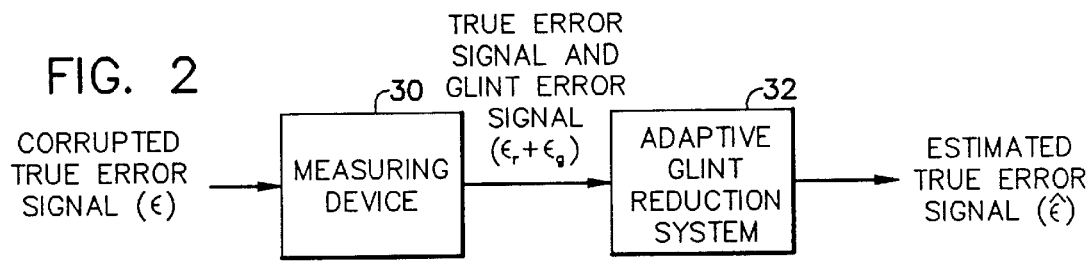
FIG. 2 is a block diagram of a basic implementation of the adaptive glint reduction system.

The present invention employs a method and system for adaptively reducing glint error in the radar system measured line of sight to a target. FIG. 2 illustrates a measuring device 30, which may typically be a radar system that includes an antenna, receiver, detectors, and digital signal processor. Measuring device 30 receives target radar reflections that are indicative of the glint corrupted true angular error $\epsilon$ and generates an $\epsilon$ signal indicative of the sum of the true error $\epsilon_r$ and the glint error $\epsilon_g$. The $\epsilon$ signal is then provided to adaptive glint reduction system 32 of the present invention. Adaptive glint reduction system 32 employs a novel method for adaptively reducing the glint error component in the $\epsilon$ signal so as to generate a signal indicative of the estimated true error $\hat{\epsilon}$.

Figure 3:
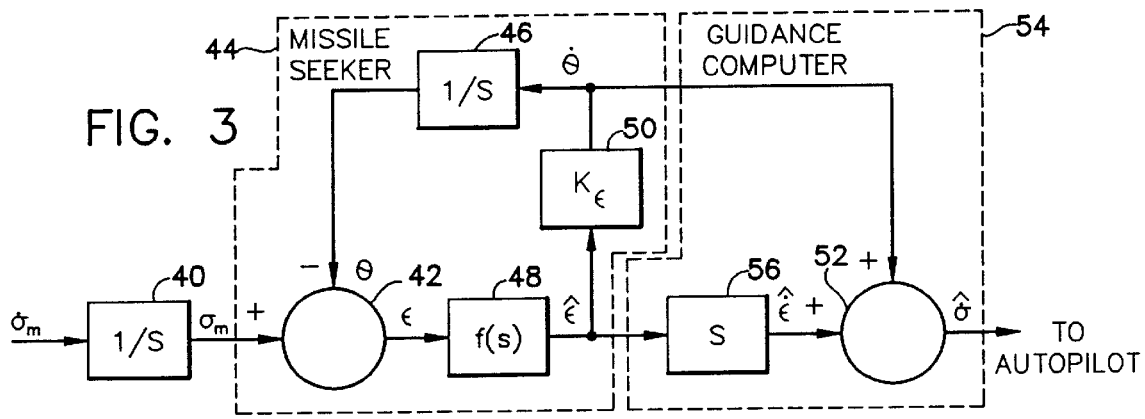
FIG. 3 is a block diagram illustrating the embodiment of the invention implemented in a line of sight (LOS) rate tracking loop as used in a guided missile.

A natural embodiment of the method and system of the present invention is in a line of sight (LOS) rate tracking loop as used in guided missiles. FIG. 3 illustrates in block diagram form an example of a guided missile line of sight (LOS) rate tracking loop employing the adaptive glint reduction method and system.

The tracking loop of FIG. 3 has as an input signal $\dot{\sigma}_m$ which is indicative of the rate of change between the apparent inertial line of sight to the tracked target and the missile reference axis. The signal $\dot{\sigma}_m$ is input to integrator 40 which integrates the input signal and provides a corresponding output signals $\sigma_m$. The signal $\sigma_m$ is indicative of the measured angle between the apparent line of sight to the tracked target and the missile reference axis. The signal $\sigma_m$ is applied to combining point 42 in the missile seeker head track loop of missile seeker section 44.

The missile seeker head track loop generates a signal $\dot{\theta}$, indicative of the rate of change of the angle $\theta$ between the antenna boresight and the missile reference axis. The signal is typically obtained from the missile rate gyro. The signal $\dot{\theta}$ is integrated in integrator 46 which provides the output signal $\theta$. The signal $\theta$, representative of the angle $\theta$ between the antenna boresight and the missile reference axis, is also applied to combining point 42. Combining point 42 combines the signals $\sigma_m$ and $\theta$ to provide an output signal $\epsilon$ that is representative of the measured angular displacement between the apparent line of sight and the antenna boresight where:

$$\epsilon = \sigma_m - \theta. \quad (1)$$

The signal $\epsilon$ is input to adaptive glint reduction system 48 which reduces the glint error component $\epsilon_g$ in the angular displacement $\epsilon$ between the measured line of sight to the target and the antenna boresight axis. Adaptive glint reduction system 48 provides a corresponding output signal $\hat{\epsilon}$ indicative of an estimate of the angular displacement between the true line of sight to the target and the antenna boresight. The signal $\hat{\epsilon}$ is provided to block 50 which represents the track loop gain $K_\epsilon$. Loop gain block 50 multiplies the signal $\hat{\epsilon}$ by the track loop gain $K_\epsilon$ so as to provide the output signal $\dot{\theta}$ to integrator 46.

The signal $\dot{\theta}$ output from loop gain block 50 is also provided to combining point 52 in the guidance computer track loop of guidance computer 54. In addition, the signal $\hat{\epsilon}$ output from adaptive glint reduction system 48 is applied to differentiator 56 in the guidance computer track loop where it is differentiated. The differentiated estimate signal $\dot{\hat{\epsilon}}$ output from differentiator 56 is provided to combining point 52. Combining point 52 sums the signals $\dot{\theta}$ and $\dot{\hat{\epsilon}}$ to provide the signal $\dot{\hat{\sigma}}$. The signal $\dot{\hat{\sigma}}$ corresponds to the rate of change of the estimated angle between the true line of sight to the target and the missile target. The signal $\dot{\hat{\sigma}}$ is provided to the missile autopilot (not shown) where the signal is used for guidance control.

One embodiment of the method and system of the present invention is based upon sampled data of the signal $\epsilon$. The signal $\epsilon$ contains a noise component which is representative of the glint error $\epsilon_g$. This glint or angular error noise is induced by the apparent shift in the target radar centroid and affects the measured value of the angular displacement between the antenna boresight and the true line of sight target. In a system where the signal $\epsilon$ is sampled, the sampling is typically of a rate of 10 to 1000 samples per second. In the method and system of the present invention, a sliding time-window is established in which the most recently measured N samples of the signal $\epsilon$ are used to generate a signal corresponding to the estimate $\hat{\epsilon}$ of the true angular error between the antenna boresight and the true line of sight to the target. The estimate of the angular error may be obtained by averaging the value of N samples of the signal $\epsilon$. This averaging may be traditionally accomplished by the following relationship:

$$\hat{\varepsilon} = \frac{1}{N}\sum_{k=1}^{N} \varepsilon_k \qquad (2)$$

where:

$\epsilon_k$ are the samples taken during the observation period of the sliding time-window with $\epsilon_1$ being the first sample and $\epsilon_N$ being the last or most recent sample;

N is the total number of samples in the sliding time-window; and $\hat{\epsilon}$ is the estimated angular error value.

The computation of $\hat{\epsilon}$ is performed after each new sample in a N-sample sample set is obtained and yields a current estimate of the local mean of $\hat{\epsilon}$. The signal $\hat{\epsilon}$ corresponding to the value estimated angular error is typically used, in one embodiment as an input to a guided missile seeker tracking loop and guidance computer as discussed with reference to FIG. 3.

In Laplace notation, the corresponding transfer function of equation (2) is:

$$\frac{\hat{\varepsilon}(s)}{\varepsilon(s)} = \frac{1-e^{-NTs}}{N(1-e^{-Ts})} \qquad (3)$$

where T is the sampling period:

$$T = \text{sample rate} \qquad (4)$$

If $\sigma_{ST}$ is the standard deviation of the normally distributed noise of the measured error signal $\epsilon$, it is well known that the standard deviation $\hat{\sigma}_{ST}$ of the resulting estimate is:

$$\hat{\sigma}_{ST} = \frac{1}{\sqrt{N}} \cdot \sigma \qquad (5)$$

and the variance, Var $(\hat{\epsilon})$, is:

$$\text{Var}(\hat{\varepsilon}) = \frac{\sigma_{ST}^2}{N} \qquad (6)$$

The present invention discloses a method and system for further reducing the standard deviation $\sigma_{ST}$ considering the same number of samples. A simple averaging process, such as described with respect to equation (2), may be imbedded in a more general class of discrete integrations where the individual weights of each sample may differ. Such an averaging process may be expressed as follows:

$$\hat{\varepsilon} = \sum_{k=1}^{N} W_k \, \varepsilon_k \qquad (7)$$

where, $$0 \leq W_k \leq 1, \qquad (8)$$

and $$\Sigma W_k = 1. \qquad (9)$$

In the simple averaging process of equation (2):

$$W_k = \frac{1}{N} \qquad (10)$$

where, $$k = 1, 2, \ldots N. \qquad (11)$$

It is, however, possible to determine the variance of for various weighing functions, $W_k$, for k=1,2, . . . N. Some weighting functions produce smaller variances; however, the minimum variance is not desired for the general dynamic scenario where the missile otherwise would not be responsive.

The present invention implements a weighting function, $W_k$, for each sample and is expressed as follows:

$$W_k = \frac{1}{(\varepsilon_k - \mu_k)^2 \sum_{k=1}^{N} \frac{1}{(\varepsilon_k - \mu_k)^2}} \qquad (12)$$

where, for $\epsilon_k$ k=1, 2, . . . , N are the N most recent sequential samples of $\epsilon$, with $\epsilon_1$ being the first or oldest sample in the current sample set and $\epsilon_N$ being the last or most recent sample in the current sample set, and $\mu_k$ is an estimate of $\epsilon$ based on samples of $\epsilon$ taken over a longer period of time. The portion of the equation (11):

$$\sum_{k=1}^{N} \frac{1}{(\varepsilon_k - \mu_k)^2} \qquad (13)$$

is a normalizing term for each weighting function for each sample of $\epsilon$, so that equation (9) is satisfied.

The purpose of the term $\mu_k$ is to permit, for example, a guided missile seeker to track a maneuvering target with greater dynamic response. The term may be obtained from an alpha filter, $\alpha$-filter, having the $\epsilon_k$ samples as the input and having a time constant depending on the target maneuver time constant, T. An alpha filter, which is generally well-known in the art, may be described by the following equation:

$$\mu_k = \mu_{k-1} + \alpha(\varepsilon_k - \mu_{k-1}) \qquad (14)$$

where, $\mu_{k-1}$ is the previous determination of $\mu_k$, which is usually $0 < \alpha < 1$.

For non-maneuvering or slowly maneuvering targets, the term $\alpha$ is a small value, typically, $$\alpha = \frac{T}{T_m} \qquad (15)$$

where, $T_m$ is the minimum anticipated target maneuver time constant, and T is the sample period.

The term $\alpha$ may be larger than this, but it should always be less than both $T/_{T_s}$ and $$\frac{1}{2N},$$

where $T_s$ is the seeker time constant. With reference to FIG. 3, Ts is equal to $1/K_\epsilon$.

In one case, the sample period T may equal 20 milliseconds, the target maneuver time constant may equal 1.5. seconds, and the seeker time constant may equal 0.25 seconds. Although the term $\alpha$ is just described as a static term, it may be modified dynamically. For example, $\alpha_k$ may be related to the ratio:

$$\frac{\varepsilon_k - \mu_{k-1}}{\mu_{k-1}} \quad (16)$$

such that, $$\alpha_k = \alpha\min, \text{ where } \frac{T}{Tm} \leq \alpha\min \leq \min\left\{\frac{T}{Ts}, \frac{1}{2N}\right\} \quad (17)$$

and $\alpha$ min is a fixed value greater than $T/T_m$ and less than both $$\frac{T}{T} \text{ and } \frac{1}{2N}$$

$$\text{if } |\varepsilon_k - \mu_{k-1}| \geq \frac{c|\mu_{k-1}|}{\alpha \min} \text{ or,} \quad (18)$$

$$\alpha_k = \alpha\max \quad (19)$$

$$\text{if } |\varepsilon_k - \mu_{k-1}| \leq \frac{C|\mu_{k-1}|}{\alpha \max}, \quad (20)$$

where $$\alpha \max \leq \min\left\{1, \frac{10T}{Ts}\right\},$$

since $\alpha$ max should provide an exponential average over at least 10% of the seeker time constant and it must be at most 1.0.
or, $$\alpha_k = \left|\frac{C \mu_{k-1}}{\varepsilon_k - \mu_{k-1}}\right| \quad (22)$$

otherwise, where $\alpha$ is updated for each new $\epsilon$ sample. The use of equation (16) permits $\alpha$ to be small, i.e. $\alpha$ min, if the deviations in $\epsilon$ are large relative to $\mu_{k-1}$, thereby denoting a high probability of target glint rather than target maneuver. The use of equation (18) permits $\alpha$ to be large, i.e. $\alpha$ max, for maneuvering targets having small glint contributions to the angular error. Equation (22) is used as a smooth transition region between the high and low target glint contribution cases of equations (16) and (18).

It should be noted that the lag of the estimate of $\hat{\epsilon}$ relative to the true value of $\epsilon$ is never more than N samples, in spite of a small value of $\alpha$.

With reference to FIG. 3, the method of adaptively reducing glint error is employed within adaptive glint reduction system 48 and is defined by the function f(s). Since adaptive glint reduction system 48 is a non-linear system, it cannot be described in common Laplace notation. However, adaptive glint reduction system 48 may be described according to the following equation:

$$\hat{\varepsilon} = \sum_{k=1}^{N} \frac{\varepsilon_k}{(\varepsilon_k - \mu_k)^2 \sum_{k=1}^{N} \frac{1}{(\varepsilon_k - \mu_k)^2}} \quad (23)$$

For independent normally distributed samples, $\epsilon_k$, the variance Var $(\hat{\epsilon})$ using the method and system of the present invention is as follows:

$$\text{Var}(\hat{\varepsilon}) = \frac{\sigma_{ST}^2}{N} \quad (24)$$

The variance of the present invention provides a significant reduction over that of conventional averaging wherein the dynamic response is unimpaired.

In the method and system of the present invention, there are two time values which are of significant interest. The first time value of significance is the sliding time-window, or alternatively, the time constant of the alpha filter. The time-window for gathering data must be on the order of the time constant of the tracking loop. A significantly longer value of a time window could lead to instability while a shorter value reduces the effectiveness in reducing glint error. A shorter time window may be used providing at least five samples are included, i.e., for a high PRF system.

The second time value of significance is that of the long-term filter which is on the order of a minimum expected target maneuver time constant. It is this second time value that is used as a comparison value for calculating the weight values. During the shorter time frame, on the order of the track loop time constant, the method and system of the present invention gives more weight to measured values of $\epsilon_k$ close to the long-term estimate $\mu_k$ of the mean value. If the target data is suddenly displaced from the long-term mean, then the weighting becomes more uniform.

The time value of the long-term filter is approximated as $T/\alpha$, typical of an exponential filter or alpha filter. This value is adoptively reduced to about 20% of the seeker time constant Ts during high-maneuver or intercept conditions, by increasing $\alpha$.

Figure 4:
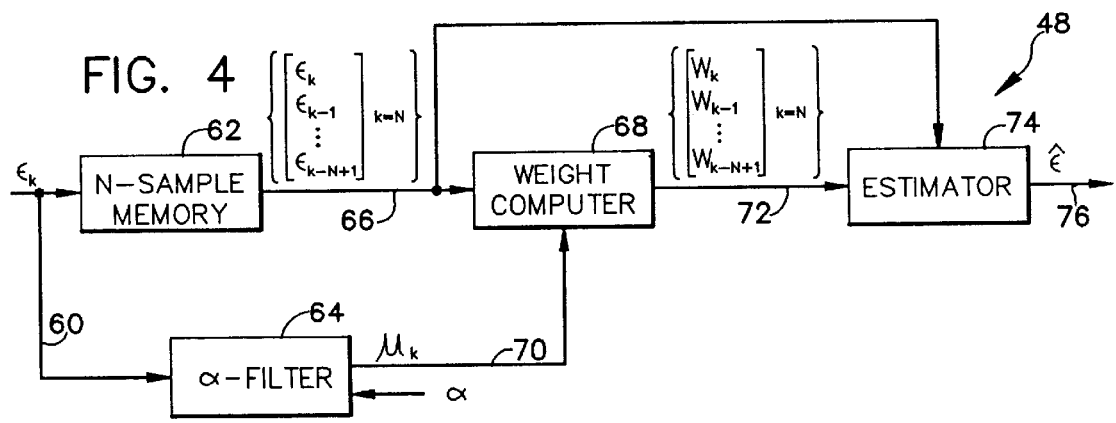
FIG. 4 is a block diagram illustrating the major components of the adaptive glint reduction system.

In FIG. 4, the system for adaptively reducing glint error is shown in block diagram form. In FIG. 4, the signal $\epsilon$ is provided as a continuous sequence of samples $\epsilon_k$. The samples $\epsilon_k$ are provided on line 60 to N sample memory 62 and alpha filter 64. N sample memory 62 may be implemented as a shift register which stores and provides the N set of $\epsilon_k$ samples, i.e. the current sample $\epsilon_N$ through the first or oldest sample $\epsilon_1$ as a sample set output on line 66 to weight computer 68.

Alpha filter 64 uses the current sample to compute the current long-term estimate of $\epsilon$ and provides the current long-term estimate $\mu_k$ on line 70 to weight computer 68. Weight computer 68, which may be implemented as a small preprogrammed arithmetic logic unit (ALU) computes the set of weighting factors based upon the values of the set of $\epsilon_k$ samples and the corresponding long-term estimates $\mu_k$ of $\epsilon$.

Weight computer 68 computes the weighting factors corresponding to each $\epsilon_k$ sample and its corresponding estimate $\mu_k$ in accordance with equation (12). Weight computer 68 provides output signals indicative of each weighting factor $W_k$ corresponding to each $\epsilon_k$ sample in the current N $\epsilon_k$ sample set, along with the corresponding $\epsilon_k$ samples in the N sample set, on line 72 to estimator 74.

Estimator 74 may also typically be a small preprogrammed arithmetic logic unit (ALU) which multiplies the value of each $\epsilon_k$ sample by its corresponding weighting factor $W_k$ to provide a weighted sample value $\epsilon_k'$. Estimator 74 sums or integrates the resultant product of the multiplication step, i.e., the weighted sample values, for the N $\epsilon_k$ sample set. The resultant summation of the N $\epsilon_k$ sample set weighted samples is the estimate of the true angular error $\hat{\epsilon}$ and is provided as an output signal on line 76.

When the next $\epsilon_k$ sample is taken, a new set of N $\epsilon_k$ samples is considered. In the new set of N $\epsilon_k$ samples, the $\epsilon_k$ samples from the previous set of N$\epsilon_k$ are considered, except for the oldest value of $\epsilon_k$. For example, from the previous set of value $\epsilon_N$ becomes the value $\epsilon_{N-1}$ in the current set. Also the value $\epsilon_2$ in the previous set becomes the oldest or first value $\epsilon_1$ in the new set. The new and now current $\epsilon$ sample is used to update the value $\mu_k$. Furthermore, a new weighting factor $W_k$ is computed for each $\epsilon_k$ sample. The value of each $\epsilon_k$ sample in the new set of samples is then multiplied by a new corresponding weighting factor $W_k$ to provide an updated weighted sample value $\epsilon_k'$. The new set of weighted sample values $\epsilon_k'$ are summed to provide an updated estimated of the true angular error $\epsilon_k$.

In the missile loop tracking environment, tracking is normally performed along two approximately orthogonal axes. For example, tracking is normally performed with reference to azimuth and elevation axes. In accordance with the present invention, a separate adaptive glint reduction system would be employed for each tracking channel. Since effectiveness of the device may be degraded if the glint disturbances in each channel is correlated therebetween, additional steps are necessary to suppress the correlation effect. In reducing the degradation caused by correlation in the data, a linear regression step is performed on the data to estimate a linear regression coefficient. The resulting linear regression coefficient is used in rotating the two axes such that data correlation is minimized. The time frame for the averaging necessary for the calculation of the estimated linear regression coefficient is similar to the long-term value used to compute the long-term estimate $\mu_k$ of $\epsilon$.

Figure 5:
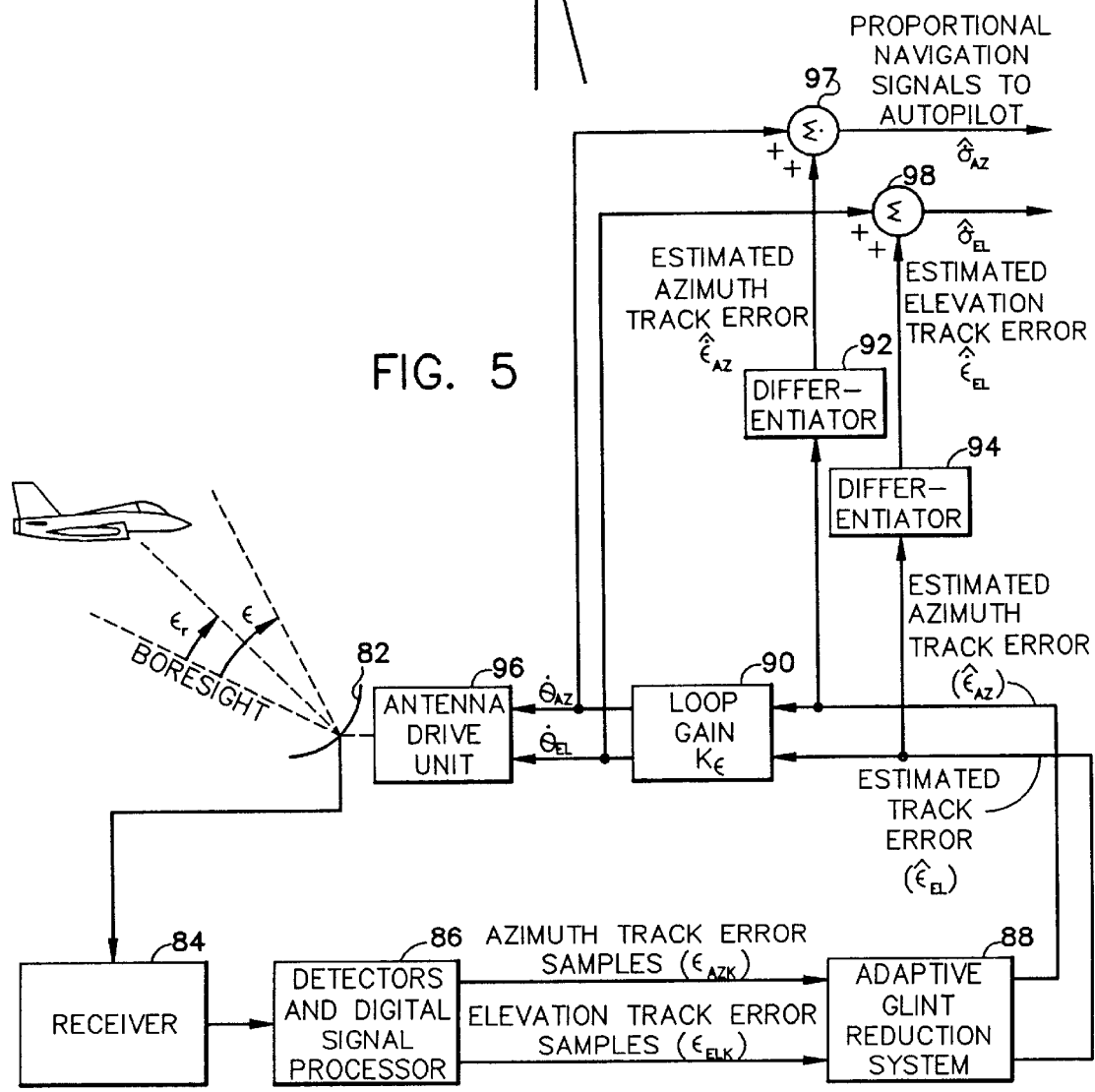
FIG. 5 is a block diagram of a radar system incorporating the adaptive glint reduction system in a missile LOS rate tracking loop system in which tracking is performed in two approximately orthogonal axes.

FIG. 5 illustrates in block diagram form a typical two channel missile radar system for tracking a target along the azimuth and elevation axes. In FIG. 5, target 80 is tracked by the missile's radar system for which the target return signal is received at antenna 82. The return signal is coupled to radar receiver 84, which amplifies and filters the return signal. Receiver 84 provides an output signal to the detectors and digital signal processor unit 86.

Unit 86 converts the analog signal output from receiver 84 into digital azimuth and elevation track error signal samples, respectively $\epsilon_{AZ_k}$ and $\epsilon_{EL_k}$. These track error signal samples are provided to adaptive glint reduction system 88.

Adaptive glint reduction system 88 computes a glint reduced estimate in the angular track error and generates an output of estimated azimuth and elevation track error signals, respectively $\hat{\epsilon}_{AZ}$ and $\hat{\epsilon}_{EL}$, which are coupled to loop gain block 90. The signals $\hat{\epsilon}_{AZ}$ and $\hat{\epsilon}_{EL}$ are also respectively coupled to differentiators 92 and 94. The output of loop gain block 90 is the signals $\dot{\theta}_{AZ}$ and $\dot{\theta}_{EL}$ which are respectively representative of the rate of change of the angle between the antenna electrical boresight and the missile azimuth and elevation reference axes. The signals $\dot{\theta}_{AZ}$ and $\dot{\theta}_{EL}$, are coupled to antenna drive unit 92. In response to signals $\dot{\theta}_{AZ}$ and $\dot{\theta}_{EL}$, antenna drive unit 92 positions antenna 82 to reduce the angular azimuth and elevation errors between the antenna boresight and the true line of sight to the target.

Adaptive glint reduction system 88 reduces the glint induced noise component in the track error signal such that the antenna boresight may be aligned with a true line of sight to the target. The estimated azimuth and elevation track error signals, $\hat{\epsilon}_{AZ}$ and $\hat{\epsilon}_{EL}$, are separately differentiated in differentiators 92 and 94 with the outputs thereof being respectively as the signals $\dot{\hat{\epsilon}}$ and $\dot{\hat{\epsilon}}$. The signals $\dot{\hat{\epsilon}}$ and $\dot{\hat{\epsilon}}$ are respectively provided combining points 97 and 98. Similarly, the signals $\dot{\theta}_{AZ}$ and $\dot{\theta}_{EL}$ from loop gain block 90 are also respectively provided to combining points 97 and 98. The signal $\dot{\hat{\epsilon}}$ and the signal $\dot{\theta}_{AZ}$ are summed in combining point 97 to provide an output signal $\hat{\sigma}$ corresponding to the estimated rate of change of the angle between the true line of sight to the target and 10 the missile azimuth reference axis. Similarly, the signals $\dot{\hat{\epsilon}}$ and $\dot{\theta}_{EL}$ are summed in combining point 98 to provide an output signal $\hat{\sigma}$ which is an estimate of the rate of change of the angle between true line of sight to the target and the missile elevation reference axis.

Figure 6:
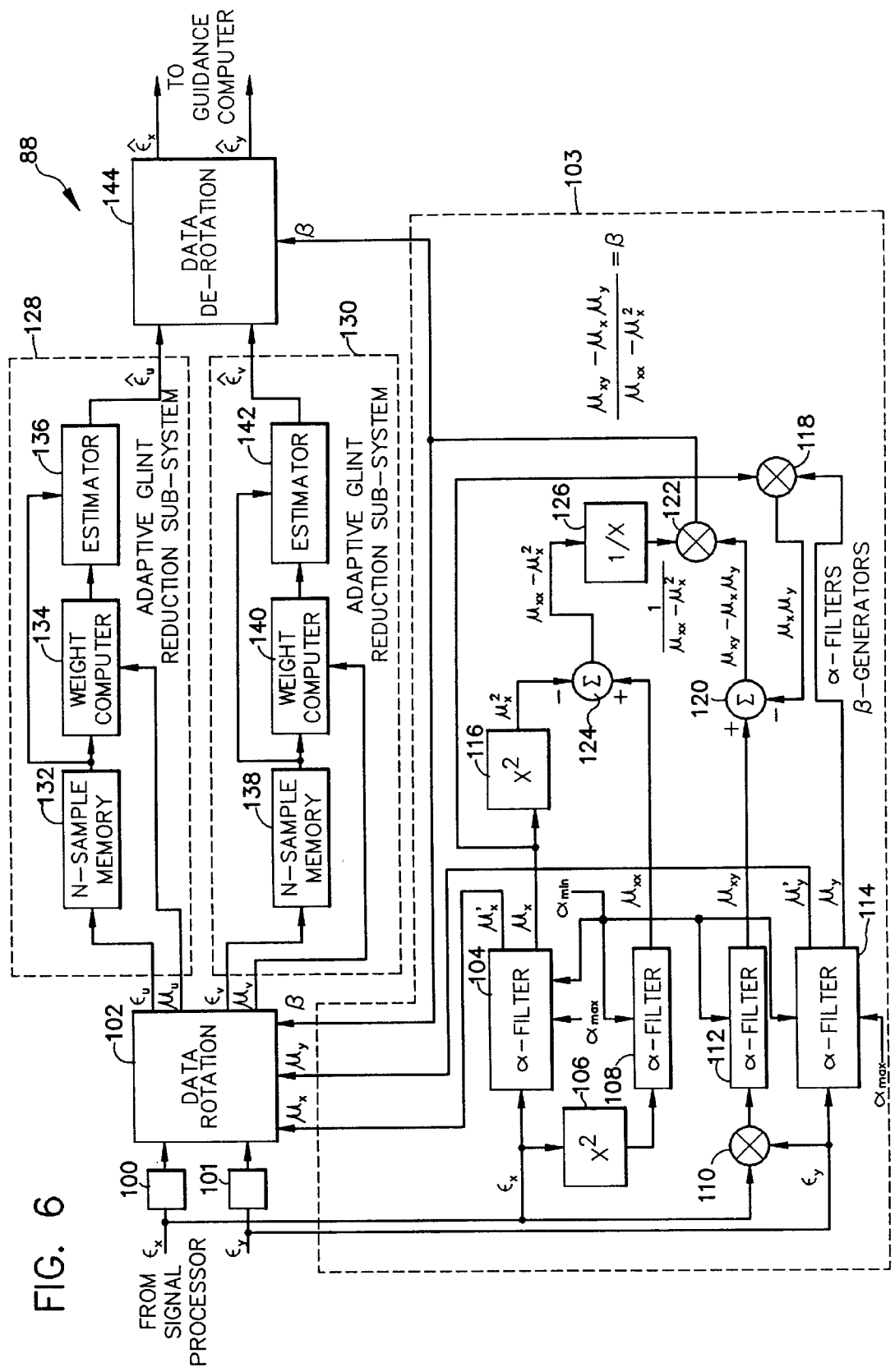
FIG. 6 is a block diagram of the adaptive glint reduction system for target tracking along two orthogonal axes.

FIG. 6 illustrates in detail the processing of track error samples in a two channel adaptive glint reduction system. In FIG. 6, the azimuth and elevation track error samples, $\epsilon_x$ and $\epsilon_y$, are provided from the detector and digital signal processor unit.

The azimuth and elevation track error samples $\epsilon_x$ and $\epsilon_y$ are respectively coupled to N-sample memories or shift registers 100 and 101. The N most recent samples are coupled from memories 100 and 101 to data rotation unit 102. These samples are also provided to alpha filter and beta generator portion 103.

Figure 7:
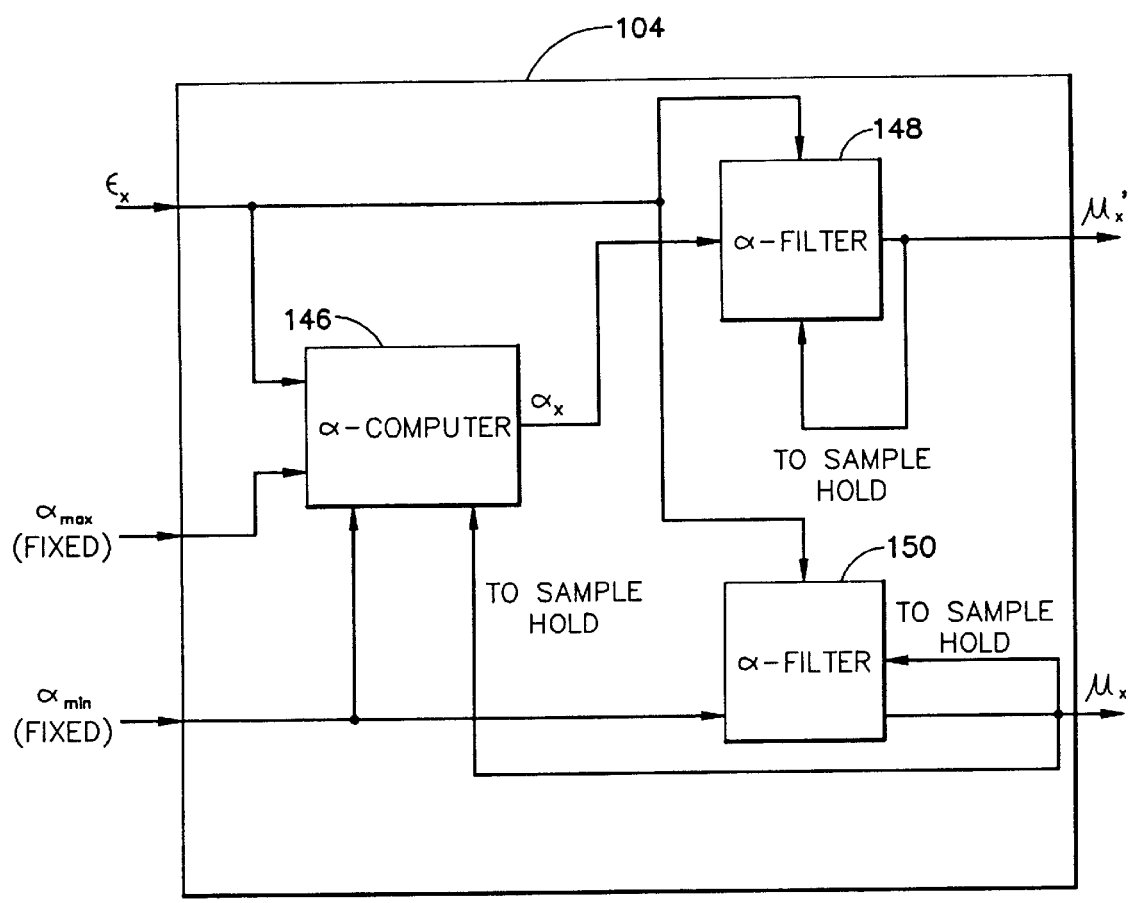
FIG. 7 is a block diagram exemplifying a typical alpha filter of FIG. 6.

In FIGS. 6 and 7, the $\epsilon_x$ samples are coupled to alpha filter 104 along with signals representative the static alpha values, $\alpha$ min and $\alpha$ max. Alpha filter 104 computes a dynamic alpha value $\alpha_x$ and, statically and dynamically updates the first moments of $\epsilon_x$, i.e. the long-term estimates of $\epsilon_x$. The first moments of $\epsilon_x$ are respectively output from alpha filter 104 as the output signals $\mu_x$ and $\mu_{\dot{x}}$. FIG. 7 illustrates in greater detail alpha filter 104. Alpha filter 104 includes alpha computer 146 which computes the dynamic alpha value. Alpha computer 146 receives the signals $\epsilon_k$, $\alpha$ min and $\alpha$ max along with previously computed static first moment value $\mu_x$ stored in a sample and hold in alpha computer 146. With these signals, alpha computer 146 generates the dynamic value, $\alpha_x$. The value $\alpha_x$ is provided to alpha filter 148. Alpha filter 148 updates the dynamic first moment of $\epsilon_x$, i.e. $\mu_{\dot{x}}$. The value is computed from the input of $\epsilon_x$, $\alpha_x$ and the previously computed value of $\mu_{\dot{x}}$ stored in a sample and hold in alpha filter 148. Alpha filter 150 updates the static first moment of $\epsilon_x$, i.e. $\mu_x$. The value $\mu_x$ is computed from the input of $\epsilon_x$, $\alpha$ min, along with the previously computed value of $\mu_x$ stored in a sample and hold in alpha filter 150.

In alpha filter 104 the values $\mu_x$, $\mu_{\dot{x}}$ and $\alpha_x$ are defined by the following equations:

$$\mu_{x_k} = \mu_{x_{k-1}} + \alpha \min (\epsilon_{x_k} - \mu_{x_{k-1}}) \quad (25)$$

$$\mu_{\dot{x}_k} = \mu_{\dot{x}_{k-1}} + \alpha_{x_k}(\epsilon_{x_k} - \mu_{\dot{x}_{k-1}}), \quad (26)$$

and where $\alpha_{x_k}$ is defined by equations (16) through (22).

The signal $\epsilon_x$ is also coupled through squaring block 106 where the signal is squared in value with the resultant output signal $\epsilon_x^2$ provided to alpha filter 108. The signal $\epsilon_x$ is also coupled to an input of multiplier 110 where the signal $\epsilon_y$ is also provided as an input. Multiplier 110 multiplies the value of the two signals $\epsilon_x$ and $\epsilon_y$ so as to provide an output signal $\epsilon_x\epsilon_y$ to alpha filter 112. The signal $\epsilon_y$ is also coupled directly to alpha filter 114 in addition to signals representative of the static alpha values, $\alpha$ min and $\alpha$ max. Alpha filter 114 updates the static and dynamic first moments of $\epsilon_y$ and provides respectively the output signals $\mu_y$ and $\mu_{\dot{y}}$ in a manner similar to that described with reference to alpha filter 104.

The dynamic first moment signal $\mu_{\dot{x}}$ is output from alpha filter 104 and provided as an input to data rotation unit 100. Similarly, the dynamic first moment signal $\mu_{\dot{y}}$ is output from filter 114 and provided as an input to data rotation unit 100. The static first moment signal $\mu_x$ is output from alpha filter 104 to squaring block 116 and multiplier point 118. Similarly, the static first moment signal $\mu_y$ is also coupled to multiplier 118. Multiplier 118 multiplies the values of signals $\mu_x$ and $\mu_y$ with the product signal $\mu_x\mu_x$ output to summing point 120. Alpha filter 112 generates, from the input $\alpha$ min signal and the $\epsilon_x\epsilon_y$ signal, a cross-moment signal $\mu_{xy}$ which is also output to summing point 120. At summing point 120, the value of the signal $\mu_x\mu_y$ is subtracted from the value of the signal $\mu_{xy}$ with the signal representative of the difference thereof, i.e., the signal $\mu_{xy}-\mu_x\mu_y$, provided as an output to multiplier 122.

The value of the signal $\mu_x$ provided from alpha filter 104 to squaring block 116 where the value of the signal is squared and provided as the output signal $\mu_x^2$ to summing point 124. Alpha filter 108 computes the second moment of the $\epsilon_x$ sample from the $\epsilon_x^2$ signal and an input alpha value $\alpha$ min to generate the signal $\mu_{xx}$. The signal $\mu_x$ is output from alpha filter 108 to summing point 124. The value of the signal $\mu_x^2$ is subtracted from the value of the signal $\mu_{xx}$ in summing point 124 to provide a corresponding output signal $\mu_{xx}-\mu_x^2$ to inverter 126. Inverter 126 inverts the value of the signal $\mu_{xx}-\mu_x^2$ and provides an output signal $$\frac{1}{\mu_{xx}-\mu_x^2}$$

to multiplier 122. The signals $$\frac{1}{\mu_{xx}-\mu_x^2}$$

and are multiplied in multiplier 122 and provided as an output signal $$\frac{\mu_{xy}-\mu_x\mu_y}{\mu_{xx}-\mu_x}$$

or $\beta$. The signal $\beta$, representative of the slope of the least squares linear fit of the $\epsilon_x$ and $\epsilon_y$ samples, is output to data rotation unit 102.

Figure 8:
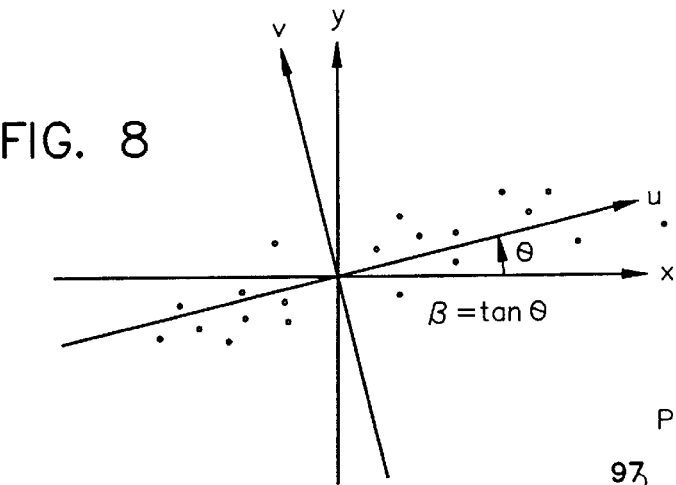
FIG. 8 is a diagram illustrating the relationships between the two orthogonal tracking axes and corresponding data rotation axes.

In data rotation unit 102, a data rotation matrix is generated and the $\epsilon$ samples in the X and Y coordinate system are rotated to a new frame of reference, e.g. a U-V coordinate system (FIG. 8). The signal. $\epsilon$ input to data rotation unit 102 as the slope of the least squares linear fit of the measured $\epsilon_x$ and $\epsilon_y$ samples is used to rotate the data to the U-V coordinate system. This slope value $\beta$ is specifically necessary to generate a rotation matix for use in rotating the frame of reference for the measured samples $\epsilon_x$ and $\epsilon_y$. In data rotation unit 102, the samples $\epsilon_x$ and $\epsilon_y$ are rotated along with the first moments $\mu_x$ and $\mu_y$ to provide the respective signals $\epsilon_u$, $\epsilon_v$, $\mu_u$ and $\mu_v$ in a U-V coordinate system. The output from data rotation unit 102 are the rotated measured samples $\epsilon_u$ and $\epsilon_v$ and the rotated dynamic first moments $\mu_u$ and $\mu_v$. The samples $\epsilon_u$ and the dynamic first moments $\mu_u$ are provided to adaptive glint reduction sub-system 128. Similarly, the samples $\epsilon_v$ and the dynamic first moments $\mu_v$ are provided to adaptive glint reduction sub-system 130.

Adaptive glint reduction sub-system 128 is comprised of an N sample memory 132, weight computer 134, and estimator 136. Similarly, adaptive glint reduction sub-system 130 is comprised of N sample memory 138, weight computer 140, and estimator 142.

The samples $\epsilon_u$ are coupled from data rotation unit 102 to N sample memory 132 which stores the N most recent samples. The N most recent samples of $\epsilon_u$ are then coupled to weight computer 134 and estimator 136. Also coupled as an input to weight computer 134 is the rotated dynamic first moment signal $\mu_u$. Weight computer 134 generates the sample weights $W_u$ for each corresponding sample value $\epsilon_u$. The weight values $W_u$ are output from weight computer 134 to estimator 136. Estimator 136 multiplies each sample value $\epsilon_u$ by a corresponding weight value $W_u$ to produce corresponding weighted samples $\epsilon_{\epsilon u}$. The weighted samples $\epsilon_{\dot{u}}$ are summed in estimator 136 and output as the rotated estimated angular error signal $\hat{\epsilon}_u$. The signal $\hat{\epsilon}_u$ is coupled to data de-rotation unit 144.

Similarly, the rotated samples $\epsilon_v$ are coupled from data rotation unit 102 to N sample memory 138 to weight computer 140 and estimator 142. In addition, the rotated first moment signal $\mu_v$ is also coupled as an input to weight computer 140. The output of weight computer 140 is coupled to estimator 142 which provides as an output signal the rotated estimated signal $\hat{\epsilon}_v$ to data de-rotation 144. Data 144 returns the values of the estimated signals $\hat{\epsilon}_u$ and $\hat{\epsilon}_v$ to the original X-Y coordinate system for output as the signals $\hat{\epsilon}_x$ and $\hat{\epsilon}_y$ to the guidance computer.

Figure 9A:
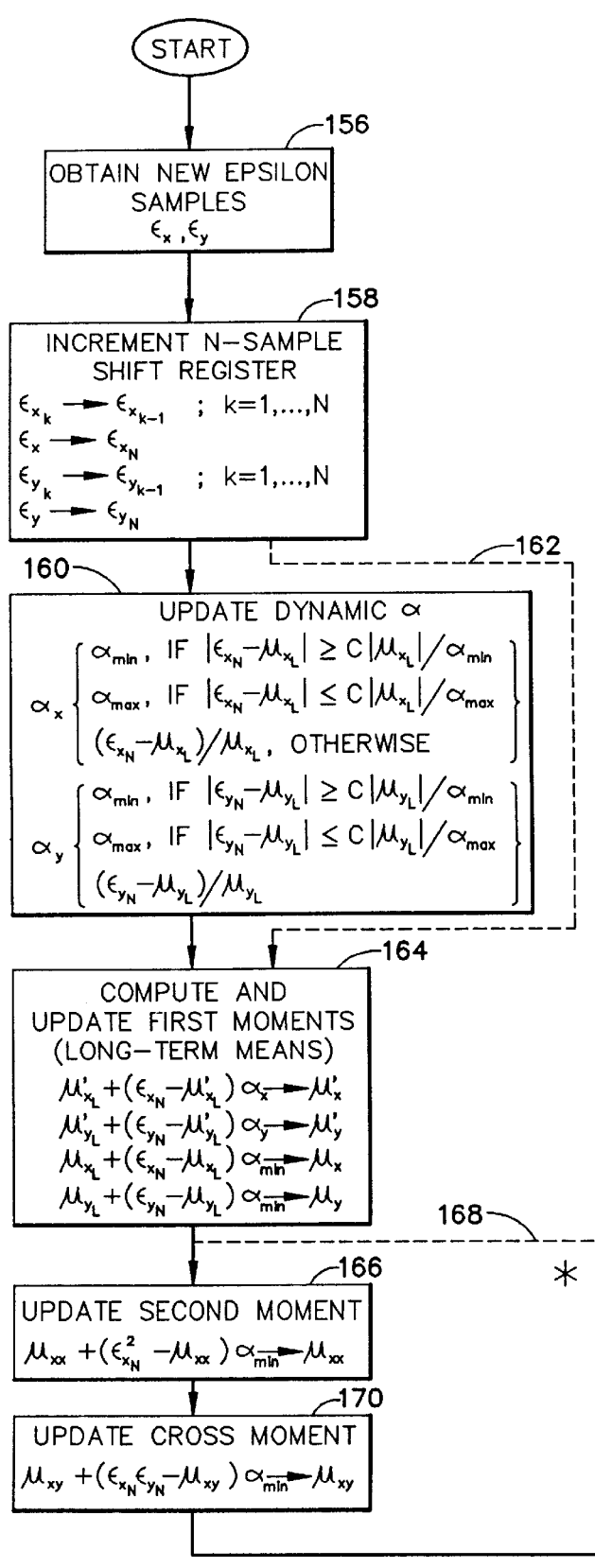
FIG. 9 is a flow chart illustrating the processing in the adaptive glint reduction method and system of the present invention of target tracking data obtained along two axes.
Figure 9A:
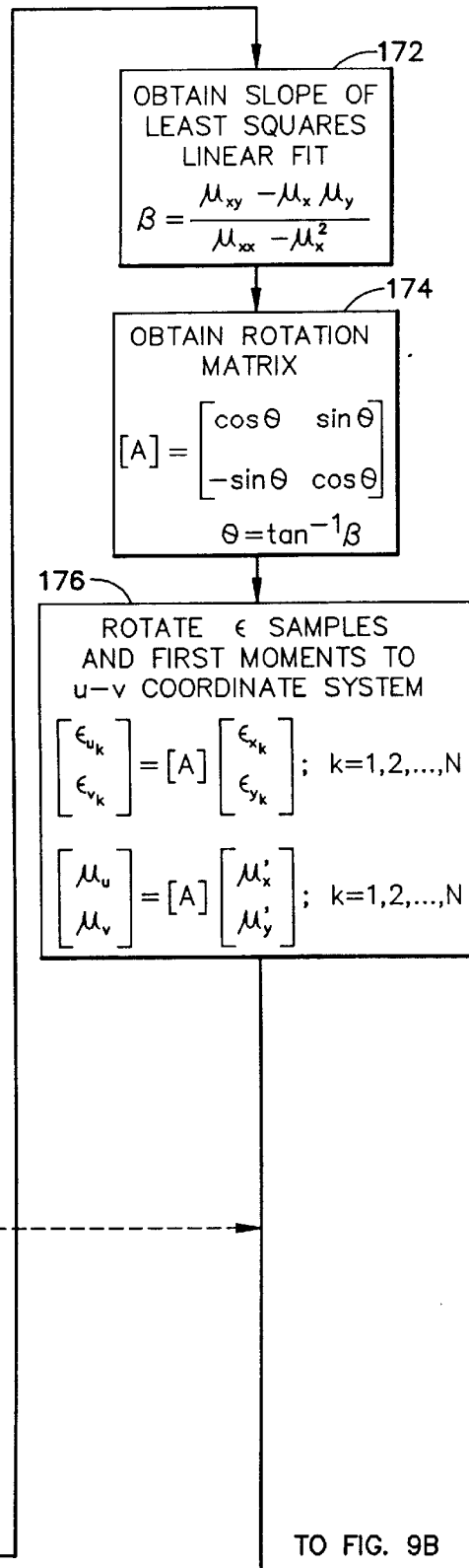

FIG. 9 illustrates the steps in processing of track error samples obtained along two axes, such as in a system of FIG. 6. The processing begins in obtaining the most recent track error samples as illustrated in block 156. A pair of sample shift register increments and saves the newest samples $\epsilon_x$ and $\epsilon_y$ with the oldest sample in the series of samples being deleted. Therefore, each N sample shift register contains the N most recent samples of the track error samples as indicated by block 158. Next, the dynamic alpha is updated as illustrated by block 160. After the dynamic alpha is updated, the dynamic and static first moments of the track error are updated in block 164. In systems not employing data rotation, the process of updating the dynamic alpha may be eliminated, as illustrated by line 162, such that $\mu_x=\mu_{\dot{x}}$ and $\mu_y=\mu_{\dot{y}}$.

In a system employing data rotation, the second moment is next updated as indicated in block 166. After updating the second moment, the cross moment is generated and updated as illustrated in block 170. Upon obtaining the udpated cross moment, the system generates the slope of the least squares linear fit from the static first moments and cross moment data, as illustrated in block 172.

Upon obtaining the slope of the least squares linear fit, the arctangent of the slope value $\beta$ is used to generate an angle $\theta$. The rotation matrix [A] is generated with the angle $\theta$ used as indicated in block 174. Next, each set of track error samples $\epsilon_x$ and $\epsilon_y$ and each set of dynamic updated first moments $\mu_{\dot{x}}$ and $\mu_{\dot{y}}$ undergo a matrix multiplication which rotate the sampled data from an X-Y coordinate system to a U-V coordinate system.

The rotated data $\epsilon_u$, $\epsilon_v$, $\mu_u$ and $\mu_v$ is provided to block 178, where the unnormalized weights are computed. In a system where the data is not rotated, the computed static first moments from block 164 and the track error samples are used directly for obtaining the unnormalized weights. In the non-rotated data system, data is processed directly from block 164 via line 168 to block 178.

Next, the weight normalizations are computed for each $\epsilon$ sample in each N sample set as indicated in block 180. The next step in the processing is obtaining the normalized weights for each $\epsilon$ sample in each N sample set as indicated by block 182. The normalized weights are used in computing the weighted track error estimates $\epsilon_u$ and $\epsilon_v$ (or $\epsilon_x$ and $\epsilon_y$ for the non-rotation system) as indicated by block 184.

In a data rotation system, the data is next returned, as illustrated in block 186, to an X-Y coordinate system by matrix multiplication where the value matrix identified as $[A^r]$. In instances where the data is not rotated, the weighted track error estimates from block 184 are provided via line 188 to block 190 as the output track error estimates. In cases where the data de-rotation is performed, as indicated by block 186, the X-Y coordinate system track error estimates are provided to block 190 where he track error estimates are output.

Although the above description is described with reference to sampled data, it is envisioned that one of ordinary skill in the art may adapt the method and system of the present invention for processing continuous track error data. Furthermore, as the invention is described with reference to a line of sight rate tracking loop, it is further envisioned that the method and system may also be implemented in fixed antenna systems for the reduction of glint error in target tracking data.

The previous description of the preferred embodiments are provided to enable any persons skilled in the art to make or use the present invention. Various modifications to these embodiments will be readily apparent to those skilled in the art and the generic principles defined herein may be applied to other embodiments without the use of the inventive faculty. Thus, the present invention is not intended to be limited to the embodiments shown herein, but is to be accorded the widest scope consistent with the principles and novel features disclosed herein.

What is claimed is:

1. A method for adaptively reducing, in a displacement signal having a value indicative of a measured angular displacement $\epsilon$ between an antenna boresight and an apparent line of sight to a target, a noise signal having a value indicative of an angular error induced by a shift in the target radar centroid so as to provide an output signal having a value indicative of an estimate $\hat{\epsilon}$ of a true angular displacement signal between the antenna boresight and a true line of sight to the target, comprising the steps of:

providing a series of sequential samples of said displacement signal each having a respective sample value $\epsilon_k$;

generating in response to each sample value $\epsilon_k$, a corresponding value $\mu$ indicative of a long-term estimate of said measured angular displacement $\epsilon$;

generating in response to each sample value $\epsilon_k$, a corresponding weighting factor $W_k$;

multiplying each sample value $\epsilon_k$ by a corresponding weighting factor $W_k$ to provide a corresponding weighted sample value $\epsilon_k$;

summing the last N weighted sample values $\epsilon_k$;

and providing said output signal having a value corresponding to the sum of the last N weighted sample values $\epsilon_k$.

2. The method of claim 1 wherein each $\mu$ value is dependent upon a corresponding sample value $\epsilon$, a previous value of $\mu$, $\mu$, and a predetermined factor $\alpha$ according to the relationship $\mu_k = \mu_{k-1} + \alpha(\epsilon_k - \mu_{k-1})$.

3. The method of claim 2 wherein said predetermined factor $\alpha$ is determined by the relationship $\alpha = \alpha\min = T/T_m$, where T is a predetermined sampling period of said displacement signal $\epsilon$, and $T_m$ is a maneuver time constant of said target.

4. The method of claim 2 wherein said predetermined factor $\alpha$ is determined by the relationship $\alpha = \alpha$ min when $$\frac{c|\mu_{k-1}|}{\alpha \text{ min}}$$

such that min is a predetermined value at least as great as the ratio $T/T_m$ and at least as less as the lesser of $$\frac{T}{T_s} \text{ and } \frac{1}{2N}.$$

Where T is a predetermined sampling period of said displacement signal $\epsilon$, $T_s$ is a missile seeker time constant, Tm is a predetermined minimum maneuver time constant of said target, and c is a predetermined constant; by the relationship $\alpha = \alpha$ max when $|\epsilon_k - \mu_{k-1}| \leq c|\mu_k|$; where $\alpha$ max is a predetermined value at least as less as the lesser of the values 1 and $$\frac{10T}{T_s};$$

and by the relationship $$\alpha = \left| \frac{c\, \mu_{k-1}}{\varepsilon_k - \mu_{k-1}} \right|$$

otherwise.

5. The method of claim 1 wherein each weighting factor $W_k$ is determined by the relationship $$W_k = \frac{1}{(\varepsilon_k - \mu_k)^2 \emptyset}$$

where the term $\emptyset$ is a predetermined normalizing term.

6. The method of claim 5 wherein the term $\emptyset$ is determined according to the relationship $$\emptyset = \sum_{K=1}^{N} \frac{1}{(\varepsilon_k - \mu_k)^2}$$

for the last N samples of said displacement signal.

7. A system for adaptively reducing, in a displacement signal having a value indicative of a measured angular displacement between an antenna boresight and an apparent line of sight to a target, a noise signal having a value indicative of an angular error induced by a shift in the target radar centroid so as to provide an output signal having a value indicative of an estimate of a true angular displacement signal between the antenna boresight and a true line of sight to the target, comprising:

memory means for, receiving a series of sequential samples $\epsilon_k$ of said displacement signal and storing a set of N sequential samples $\epsilon_k$ of said displacement signal with a first sample and a current sample in said set respectively being samples $\epsilon_1$ and $\epsilon_N$;

filter means for, receiving each sample of said series of sequential samples $\epsilon_k$ and generating for each sample $\epsilon_k$ a signal $\mu_k$ corresponding to a long-term estimate of said measured angular displacement;

weighting means for, receiving said set of N $\epsilon_k$ samples and a corresponding set of N $\mu_k$ signals and generating a weighting factor $W_k$ corresponding to each $\epsilon_k$ sample;

estimator means for, receiving said set of N $\epsilon_k$ samples and a set of corresponding weighting factors $W_k$, multiplying each $\epsilon_k$ sample by a corresponding weighting factor $W_k$ so as to provide a corresponding weighted sample $\epsilon_k'$, summing the set of N weighted samples $\epsilon_k'$ and providing said output signal $\hat\epsilon$ as the sum of said set of N weighted samples $\epsilon_k'$.

8. The system of claim 7 wherein said memory means comprises an N sample memory having an input adapted to receive said series of sequential samples and an output.

9. A method for recursively calculating an angle between a reference axis of a missile and the boresight axis of an antenna of said missile, comprising the steps of:

providing a signal $\sigma_{m_k}$ representative of a measured angle between an apparent line of sight to a target from a missile and a reference axis of said missile;

providing a signal $\theta_{k-1}$ representative of an angle between said reference axis and a boresight axis of an antenna of said missile;

combining said signals $\sigma_{m_k}$ and $\theta_{k-1}$ to produce a signal $\epsilon_k$ representative of an angle between said apparent line of sight and said boresight axis;

generating from said signal $\epsilon_k$ a signal $\hat\epsilon_k$ representative of an estimate of an angle between a true line sight to a target from said missile and said boresight axis; amplifying said signal $\hat\epsilon_k$ by a loop gain factor $\phi$ to produce a signal $\dot\theta_k$ representative of a rate of change in said estimated angle between said reference axis and said boresight axis; and integrating said signal $\dot\theta_k$ to produce a signal $\theta_k$ representative of an updated angle between said reference axis and said boresight axis.

10. The method of claim 9 wherein said signal $\sigma_{m_k}$ is a noise corrupted signal representative of said angle between said true line of sight and said boresight axis.

11. The method of claim 9 further comprising the steps of:

differentiating said signal $\hat\epsilon_k$ to provide a signal $\hat{\dot\epsilon}$ representative of a rate of change of said estimated angle between said true line of sight and said boresight axis; and combining said signals $\hat{\dot\epsilon}$ and $\dot\theta_k$ to provide a signal $\hat{\dot\sigma}$ representative of a rate of change in angle between said true line of sight and said reference axis.

12. The method of claim 10 further comprising the steps of:

differentiating said signal $\hat\epsilon_k$ to provide a signal $\hat{\dot\epsilon}$ representative of a rate of change of said estimated angle between said true line of sight and said boresight axis; and combining said signals $\hat{\dot\epsilon}$ and $\dot\theta_k$ to provide a signal $\hat{\dot\sigma}$ representative of a rate of change in angle between said true line of sight and said reference axis.

13. The method of claim 9 further comprising the step of:

adjusting, in response to said signal $\dot\theta_k$, the position of said antenna with respect to said target so as to reduce the angle between said boresight axis and said true line of sight to said target.

14. A method for adaptively estimating the rate of change of true azimuth and elevation angles from respective substantially orthogonal azimuth and elevation reference axes of a missile having an antenna with an antenna boresight axis, comprising the steps of:

providing a signal $\sigma_{MAZ(K)}$ and a signal $\sigma_{MEL(K)}$, said signal $\sigma_{MAZ(K)}$ representative of a measured angle of azimuth between an apparent line of sight to a target from a missile and an azimuth reference axis of said missile, and said signal $\sigma_{MEL(K)}$ representative of a measured angle of elevation between an apparent line of sight to a target from esaid missile and an elevation reference axis of said missile;

providing a signal $\theta_{AZ(k-1)}$ and a signal $\theta_{EL(k-1)}$, said signal $\theta_{AZ(k-1)}$ representative of an angle of azimuth between said azimuth reference axis and a boresight axis of an antenna of said missile, and said signal $\theta_{EL(k-1)}$ representative of an angle of elevation between said elevation reference axis and said boresight axis;

combining said signals $\sigma_{mAZ(K)}$ and $\sigma_{AZ(k-1)}$ to produce a signal $\epsilon_{AZ(k)}$ representative of an angle of azimuth between said apparent line of sight and said boresight axis;

combining said signals $\sigma_{mEL(k)}$ and $\theta_{EL(k-1)}$ to produce a signal $\epsilon_{EL(k)}$ representative of an angle elevation between said apparent line of sight and said boresight axis;

generating, respectively from said signals $\epsilon_{AZ(k)}$ and $\epsilon_{EL(k)}$, signals $\hat\epsilon_{AZ(k)}$ and $\hat\epsilon_{EL(k)}$, said signal $\hat\epsilon_{AZ(k)}$ representative of an estimated angle of azimuth between a true line of sight to a target from said missile and said boresight axis, and said signal $\hat\epsilon_{EL(k)}$;

representative of an estimated angle of elevation between said true line of sight from said missile and said boresight axis;

amplifying said signals $\hat\epsilon_{AZ(k)}$ and $\hat\epsilon_{EL(k)}$ by a loop gain factor $K_\epsilon$ to respectively produce signals $\dot\theta_{AZ(k)}$ and $\dot\theta_{EL(k)}$, said signal $\dot\theta_{AZ(k)}$ representative of the rate of change in said estimated angle of azimuth between said azimuth reference axis and said boresight axis, and said signal $\dot\theta_{EL(k)}$ representative of the rate of change in said estimated angle of elevtion between said elevation reference axis and said boresight axis;

integrating separately said signals $\dot\theta_{AZ(k)}$ and $\dot\theta_{EL(k)}$ to respectively produce signals $\theta_{AZ(k)}$ and $\theta_{EL(k)}$, said signal $\theta_{AZ(k)}$ representative of an updated angle of azimuth between said azimuth reference axis and said boresight axis, and said signal $\theta_{EL(k)}$ representative of an updated angle of elevation between said elevation reference axis and said boresight axis;

differentiating separately said signals $\hat\epsilon_{AZ(k)}$ and $\hat\epsilon_{EL(k)}$ to respectively produce signals $\hat{\dot\epsilon}$ and $\hat{\dot\epsilon}$ said signal $\hat{\dot\epsilon}$ representative of the rate of change of said estimated angle of azimuth between said true line of sight and said boresight axis, said signal $\hat{\dot\epsilon}$ representative of a rate of change of said estimated angle of elevation between said true line of sight and said boresight axis;

combining said signals $\hat{\dot\epsilon}$ and $\hat{\dot\epsilon}$ respectively with said signals $\dot\theta_{AZ(k)}$ and $\dot\theta_{EL(K)}$ to provide corresponding signals $\hat{\dot\sigma}$ and $\hat{\dot\sigma}$ respectively representative of rates of change in estimated azimuth and elevation angles between said true line of sight and said azimuth and elevation reference axes.

* * * * *